US012404111B2

(12) United States Patent
Mans et al.

(10) Patent No.: US 12,404,111 B2
(45) Date of Patent: Sep. 2, 2025

(54) ROLLER CONVEYOR

(71) Applicant: Interroll Holding AG, Sant' Antonino (CH)

(72) Inventors: Erwin Mans, Hückelhoven (DE); Jürgen Zinn, Hückelhoven (DE); Stephan Kronholz, Hückelhoven (DE); Kai Lubomierski, Hückelhoven (DE)

(73) Assignee: Interroll Holding AG, Sant' Antonino (CH)

( * ) Notice: Subject to any disclaimer, the term of this patent is extended or adjusted under 35 U.S.C. 154(b) by 211 days.

(21) Appl. No.: 18/267,462

(22) PCT Filed: Dec. 10, 2021

(86) PCT No.: PCT/EP2021/085262
§ 371 (c)(1),
(2) Date: Jun. 15, 2023

(87) PCT Pub. No.: WO2022/128806
PCT Pub. Date: Jun. 23, 2022

(65) Prior Publication Data

US 2024/0043221 A1 Feb. 8, 2024

(30) Foreign Application Priority Data

Dec. 15, 2020 (DE) ......................... 102020133619.5

(51) Int. Cl.
*B65G 39/12* (2006.01)
*F16B 35/04* (2006.01)

(52) U.S. Cl.
CPC ............ *B65G 39/12* (2013.01); *F16B 35/048* (2013.01)

(58) Field of Classification Search
None
See application file for complete search history.

(56) References Cited

U.S. PATENT DOCUMENTS

| | | | | |
|---|---|---|---|---|
| 1,241,324 A | 9/1917 | Alvey | | |
| 4,056,180 A * | 11/1977 | Gunti | B65G 13/11 | 198/860.3 |
| 4,148,386 A * | 4/1979 | Bradbury | B65G 39/09 | 193/37 |
| 5,261,528 A * | 11/1993 | Bouchal | B65G 39/09 | 384/480 |
| 5,657,854 A * | 8/1997 | Chen | B65G 13/11 | 193/35 R |
| 5,857,554 A * | 1/1999 | Toye | B65G 39/09 | 193/35 R |
| 6,481,564 B2 * | 11/2002 | Kalm | B65G 13/11 | 198/782 |

(Continued)

FOREIGN PATENT DOCUMENTS

| | | | |
|---|---|---|---|
| DE | 2736131 | A1 | 2/1979 |
| DE | 19532390 | A1 | 3/1997 |
| DE | 20007323 | U1 | 9/2001 |

(Continued)

*Primary Examiner* — Kavel Singh
(74) *Attorney, Agent, or Firm* — Michael Soderman

(57) ABSTRACT

A fastening screw (2) comprising
a threaded shank (21) having an external thread,
a screw head (23),
characterized in
that a truncated circular cone section (22) is provided axially between the screw head (23)
and the threaded shank (21).

10 Claims, 3 Drawing Sheets

(56) References Cited

U.S. PATENT DOCUMENTS

| | | | |
|---|---|---|---|
| 6,726,003 | B2 | 4/2004 | Itoh et al. |

FOREIGN PATENT DOCUMENTS

| | | | | | |
|---|---|---|---|---|---|
| DE | 102008040705 | A1 | | 1/2010 | |
| DE | 202016102116 | U1 | | 9/2016 | |
| DE | 102018117806 | A1 | | 8/2019 | |
| DE | 10336304 | B4 | | 8/2020 | |
| GB | 2101061 | A | | 1/1983 | |
| GB | 2101061 | B | * | 11/1984 | ............. B65G 39/09 |
| WO | 2015051391 | A1 | | 4/2015 | |
| WO | 2015051392 | A1 | | 4/2015 | |

* cited by examiner

ROLLER CONVEYOR

CROSS REFERENCE TO RELATED APPLICATIONS

This application is the U.S. national stage of International Application No. PCT/EP2021/085262, filed on 2021 Dec. 10. The international application claims the priority of DE 102020133619.5 filed on 2020 Dec. 15; all applications are incorporated by reference herein in their entirety.

BACKGROUND

The invention relates to a roller conveyor and a method of manufacturing a roller conveyor.

A roller conveyor comprises a plurality of rollers that are held on a support frame. Goods to be conveyed can be transported on the rollers. On the one hand, the rollers can be motor rollers, which themselves have a drive motor. Such rollers have a fastening axle which is connected to the support frame via a rotationally fixed connection in order to provide support for the provision of the drive torque. The torsional strength is achieved by means of a form fit.

The rollers, on the other hand, can be passive rollers. Such passive rollers are either driven by an external motor or can rotate freely. Since no torque support is required in this case, they are merely clamped non-positively to the support frame.

SUMMARY

A fastening screw (2) comprising a threaded shank (21) having an external thread, a screw head (23), characterized in that a truncated circular cone section (22) is provided axially between the screw head (23)

and the threaded shank (21).

DETAILED DESCRIPTION

The present invention is based on the object of providing an easy way of fastening rollers on a support frame.

The object is solved by a roller conveyor as well as a method according to the main claims; embodiments are the subject of the subclaims as well as the description.

The invention provides an easy way of fastening a roller on a support frame. It is of particular Relevance that the fastening screw can be fastened to a polygonal bore which is also suitable for other types of fastening. Thus, the polygonal bore can also be used for a positive rotationally fixed connection with a fastening axis that is, in particular, of complementary design. Overall, a modular principle and reduce component complexity can be supported.

In an advantageous embodiment, the invention is used to fastening a poly-V pulley. Here, the truncated circular cone section is used specifically to build up the working tension of the poly-V belt. In this case, easier pre-assembly is possible with reduced pretension.

BRIEF DESCRIPTION OF THE DRAWINGS

The invention is explained in more detail below with reference to the figures; herein shows.

DETAILED DESCRIPTION OF THE PREFERRED EMBODIMENTS

Figure 1:
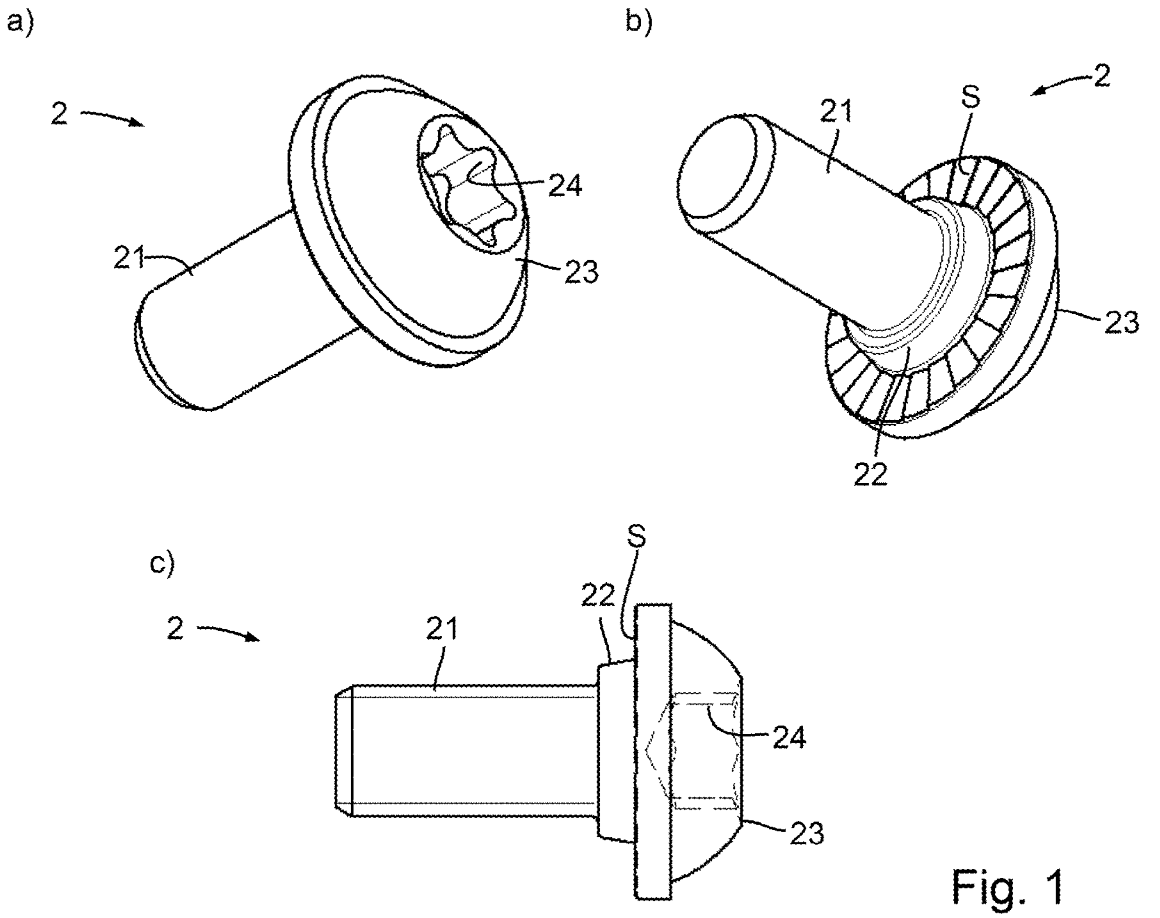
FIG. 1 a fastening screw according to the invention in different views.

The fastening screw 2 according to FIG. 1 has a threaded shank 21 with an external thread and a screw head 23. Axially between the screw head 23 and the threaded shank 21 a truncated circular cone section 22 is arranged.

Figure 5:
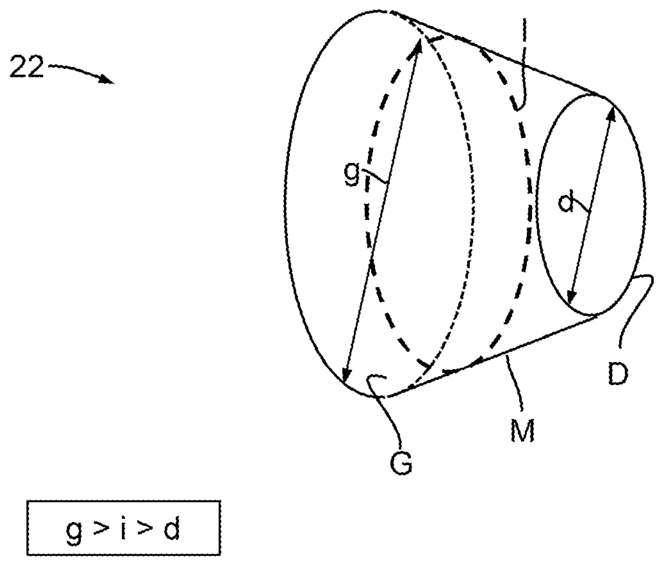
FIG. 5 truncated circular cone section of the fastening screw in isolated schematic view.

The structure of the circular frustoconical section 23 is shown schematically in FIG. 5. The circular frustoconical section 23 has a base area G with a base circle diameter g and a cover region D with a cover diameter d. The cover diameter d is smaller than the base diameter g. The base diameter g is smaller than the cover diameter d. The cover diameter d is smaller than the base diameter g.

The base area G faces the screw head 23 and the cover area D faces the threaded shank 21. The circular frustoconical section 22 and the screw head 23 are directly adjacent to each other. The base area directly adjoins a radial clamping surface S of the screw head 23.

The truncated circular cone section 22 may be formed separately by a conical sleeve which is plugged or screwed onto the threaded shaft 21. In this respect, the screw can be formed in several parts.

The radial clamping surface S need not be a smooth surface but can have a friction-enhancing surface, as shown in FIG. 1*b*.

Figure 2:
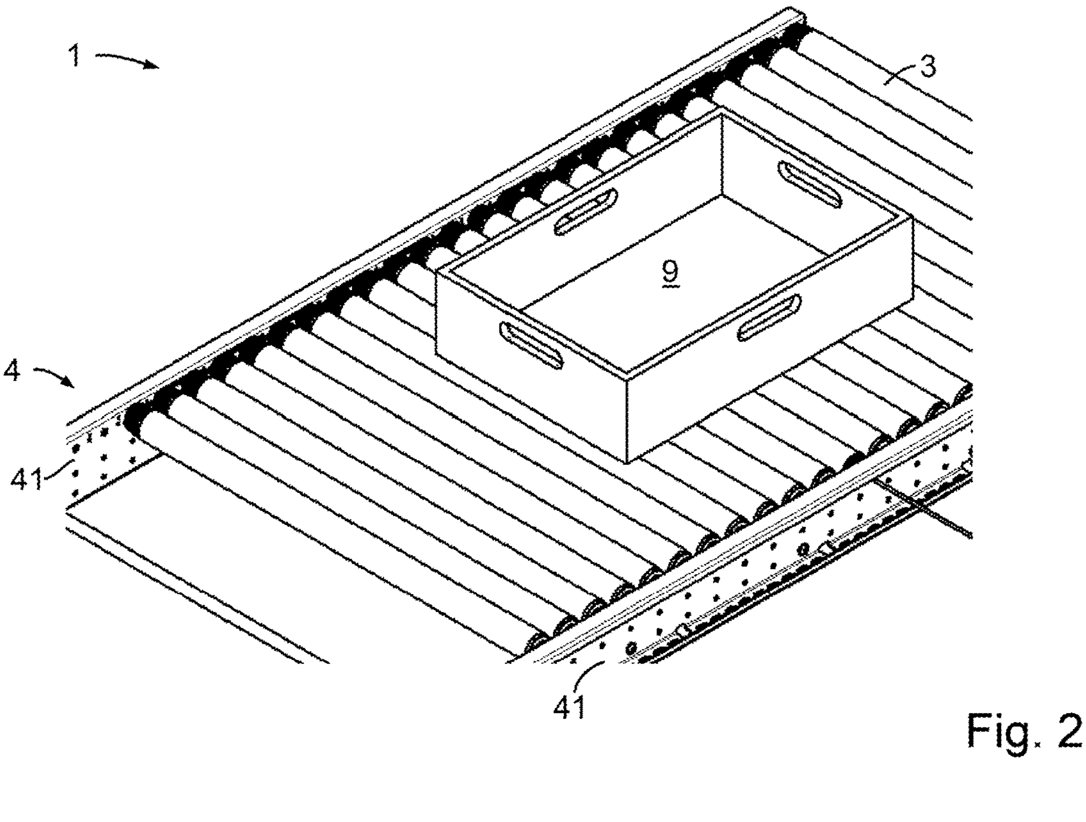
FIG. 2 a roller conveyor according to the invention.
Figure 3:
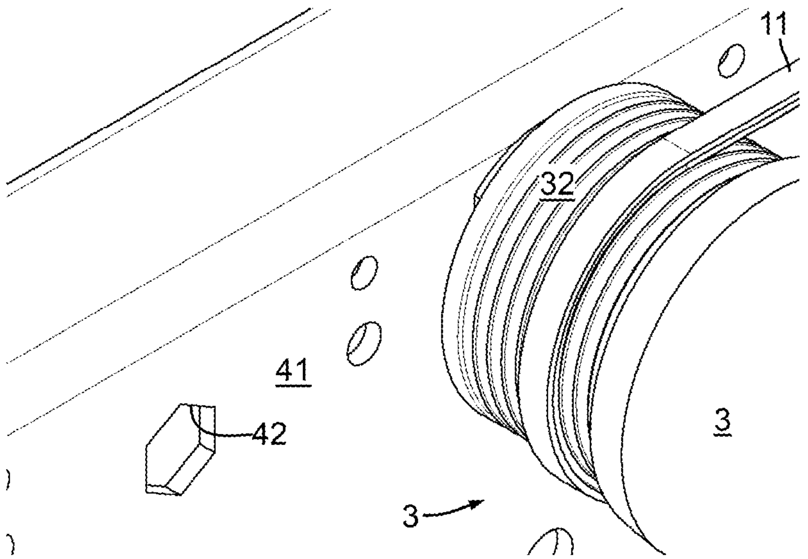
FIG. 3 a section of the support frame with the roller held on it.
Figure 4:
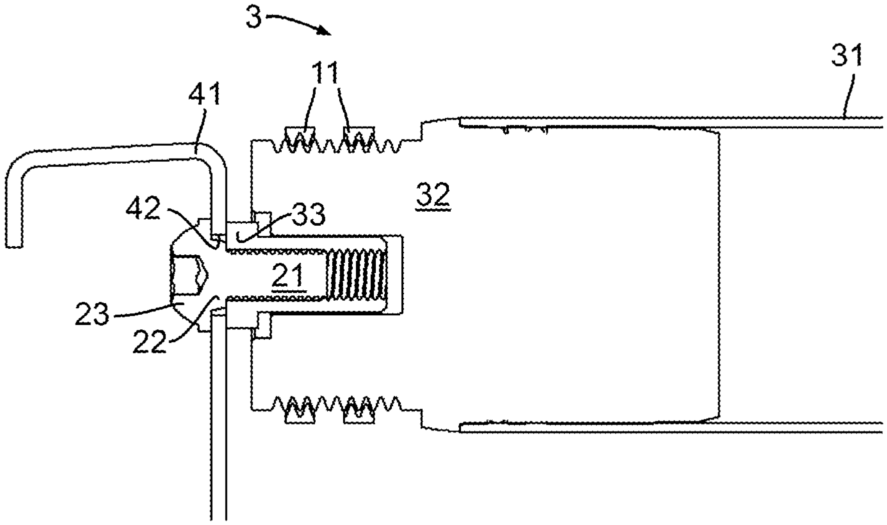
FIG. 4 a cross-section through the roller and the support frame at the fastening screw.

In one embodiment, the fastening screw 2 is used in a roller conveyor shown in FIG. 2. The roller conveyor has a plurality of conveyor rollers 3 attached to a support frame 4. At least one of the conveyor rollers 3 is fastened to the support frame 4 by means of a fastening screw 2 of the aforementioned type. For this purpose, the support frame 4 may have a support plate 41 to which the fastening is made (FIGS. 3, 4).

Figure 6:
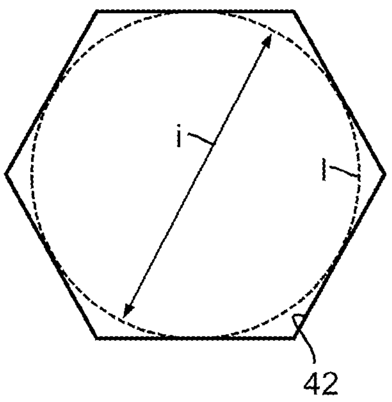
FIG. 6 isolated schematic view of the fastening bore on the support frame.

A polygonal bore 42 is provided on the support frame 4 for fastening. The screw is arranged in the polygonal bore 42 with the truncated circular cone section 22. The fastening screw 2 rests with the truncated circular cone section of 22 at an inner circle I of the polygonal bore 42 (FIGS. 4, 6).

The incircle diameter i of the polygonal bore 42 is 42 smaller than the base circle diameter g of the truncated circular cone section 22. The incircle circle diameter i is larger than a cover diameter d of the truncated circular cone section 22. These conditions apply in particular before assembly. During assembly, deformations may occur at the screw and/or the polygonal bore.

The truncated circular cone section 22 interacts with the non-circular polygonal bore 42 in a centering manner, so that the threaded shank 21 is held coaxially with the polygonal bore 42 in the clamped state. This has a particularly advantageous effect when fastening so-called poly-V rollers (e.g. disclosed in DE 103 36 304 B4). In this case, a poly-V belt 11 with high tension is attached to the roller head. For assembly, the threaded hole can initially be held eccentric to the polygonal bore 42, which reduces the tension on the poly-V belt 11. With increasing rotation of the fastening screw 2, the centering effect is established, which at the same time significantly increases the tension on the poly-V belt 11. It is now advantageous here that during pre-assembly the poly-V belt is kept under low tension when the conveyor roller 3 is attached to the support frame 4, which simplifies assembly.

The polygonal bore 42 can be a hexagonal bore. Alternatively, other shapes are also conceivable, as long as a rotation-resistant connection can be produced.

For fastening, the support frame 4 is clamped in sections between the screw head 23 and a fastening section 33 of the conveyor roller 3. The threaded shaft 21 is screwed into a threaded hole of the fastening section 33. The fastening section 33 is mounted via a pivot bearing, which is not shown, relative to a roller head and/or a roller body (FIG. 4).

Figure 7:
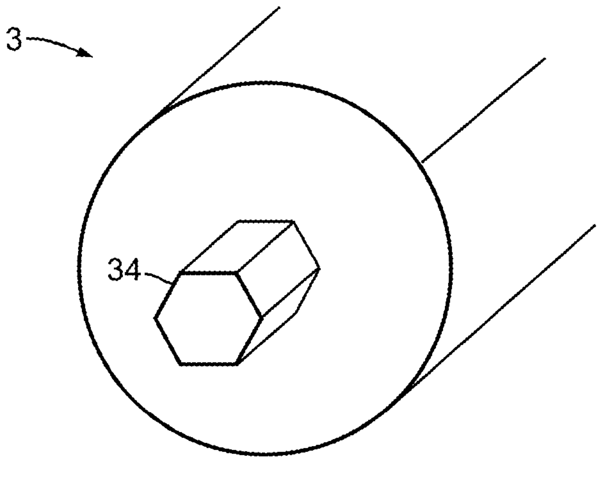
FIG. 7 a conveyor roller with a fastening axle that has a hexagonal outer circumference.

The polygonal bore is also suitable for another type of fastening of a roller. For example, FIG. 7 shows a roller that has a fastening axis 34 with an outer circumference (here an outer hexagon) that is complementary to the polygonal recess 42. The fastening axis 34 can now be inserted into the polygonal recess 42, creating a rotationally fixed connection between the fastening axis 34 and the supporting frame 4 by positive locking. The roller according to FIG. 7 is in particular a motor roller.

Consequently, both the friction-locked connection (option 1) and the torsionally rigid form-fit connection (option 2) can be used on the support frame 4 with the polygonal bore. An installer can therefore select the type of fastening method on site depending on the type of roller.

LIST OF REFERENCE NUMERALS

1 roller conveyor
11 Poly-V-belt
2 fastening screw
21 threaded shank
22 truncated circular cone section
23 screw head
24 tool engaging means
G base area
g base circle diameter
D cover area
d cover diameter
M conic surface
S clamping surface
3 conveyor roller
31 roller body
32 roller head
33 fastening section with threaded bore
34 fastening axis with hexagonal cross section
4 support frame
41 support plate
42 hexagonal bore/polygon bore
I incircle of the hexagon bore
i incircle diameter
9 conveyed good

The invention claimed is:

1. Roller conveyor (1) comprising
a plurality of conveyor rollers (3) supported on a supporting frame (4),
wherein at least one conveyor roller (3) is fixed to the supporting frame (4) by means of a fastening screw (2), said fastening screw (2) comprising
a threaded shaft (21) having an external thread,
a screw head (23),
wherein a truncated circular cone section (22) is provided axially between the screw head (23) and the threaded shaft (21),
wherein the support frame (4) is clamped in sectionally between the screw head (23) and a fastening section (33) of the conveyor roller (3),
characterized in
that the supporting frame (4) has a polygonal bore (42), the truncated circular cone section (22) being arranged in the polygonal bore (42).

2. Roller conveyor (1) according to claim 1, characterized in that the truncated circular cone section (22) has a base area (G) with a base diameter (g) and a cover area (D) with a cover diameter (d), the cover diameter (d) being smaller than the base diameter (g).

3. Roller conveyor (1) according to claim 1, characterized in,
that the base area (G) faces the screw head (23);
and that the cover area (D) faces the threaded shaft (21).

4. Roller conveyor (1) according to claim 1, characterized in
that the truncated circular cone section (22) and the screw head (23) directly adjoin each other,
in particular that the base section (G) directly adjoins a radial clamping surface(S) of the screw head (23).

5. Roller conveyor (1) according to claim 1, characterized in
that the truncated circular cone section (22) is arranged in the polygonal bore (42) in such a way that the fastening screw is thereby held centered with respect to the polygonal bore.

6. Roller conveyor according to claim 1, characterized in that the polygonal bore (42) is a hexagonal bore.

7. Roller conveyor (1) according to claim 1, characterized in
that an incircle diameter (i) of the polygonal bore (42) is smaller than a base circle diameter (g) of the truncated circular cone section (22),
in particular that the incircle diameter (i) is larger than a cover diameter (d) of the truncated circular cone section (22).

8. Roller conveyor according to claim 1, characterized in that the conveyor roller has at one end a roller head (32) to which the fastening screw (2) is attached, a poly-V belt (11) being attached to the roller head.

9. Method of manufacturing a roller conveyor (1) according to claim 1, comprising the following method steps:
providing the support frame (4) with a polygonal bore (42),
providing a conveyor roller (3),
the method comprises a selection step, wherein a selection takes place from the following two options:
(option 1) inserting the fastening screw (2) into the polygonal bore (42), wherein for fastening the, in particular passive, roller to the support frame, the circular truncated cone portion (22) is arranged in the polygonal bore (42),
and
(Option 2) inserting a fastening axis (34) of the roller, in particular a motor roller, into the polygonal bore (42), the fastening axis (34) having an outer circumference which forms a rotationally fixed connection with the polygonal bore (42) by positive locking.

10. Roller conveyor (1) comprising
a plurality of conveyor rollers (3) supported on a supporting frame (4), wherein at least one conveyor roller (3) is fixed to the supporting frame (4) by means of a fastening screw (2), said fastening screw (2) comprising
a threaded shaft (21) having an external thread,
a screw head (23),
wherein a truncated circular cone section (22) is provided axially between the screw head (23) and the threaded shaft (21),
wherein the support frame (4) is clamped in sectionally between the screw head (23) and a fastening section (33) of the conveyor roller (3),
characterized in
that the supporting frame (4) has a polygonal bore (42), the truncated circular cone section (22) being arranged in the polygonal bore (42), and
wherein
the fastening section (33) has a threaded bore, which is designed to be complementary to the shreaded shaft (21).

* * * * *